Dec. 19, 1944.  T. G. WEIHS,  2,365,503
NOW BY JUDICIAL CHANGE OF NAME
T. G. WHITE
METHOD AND APPARATUS FOR SCORING COVER GLASS
Filed March 27, 1942   3 Sheets-Sheet 1

INVENTOR
Theodore G. White
by his attorneys
Stebbins and Blenko

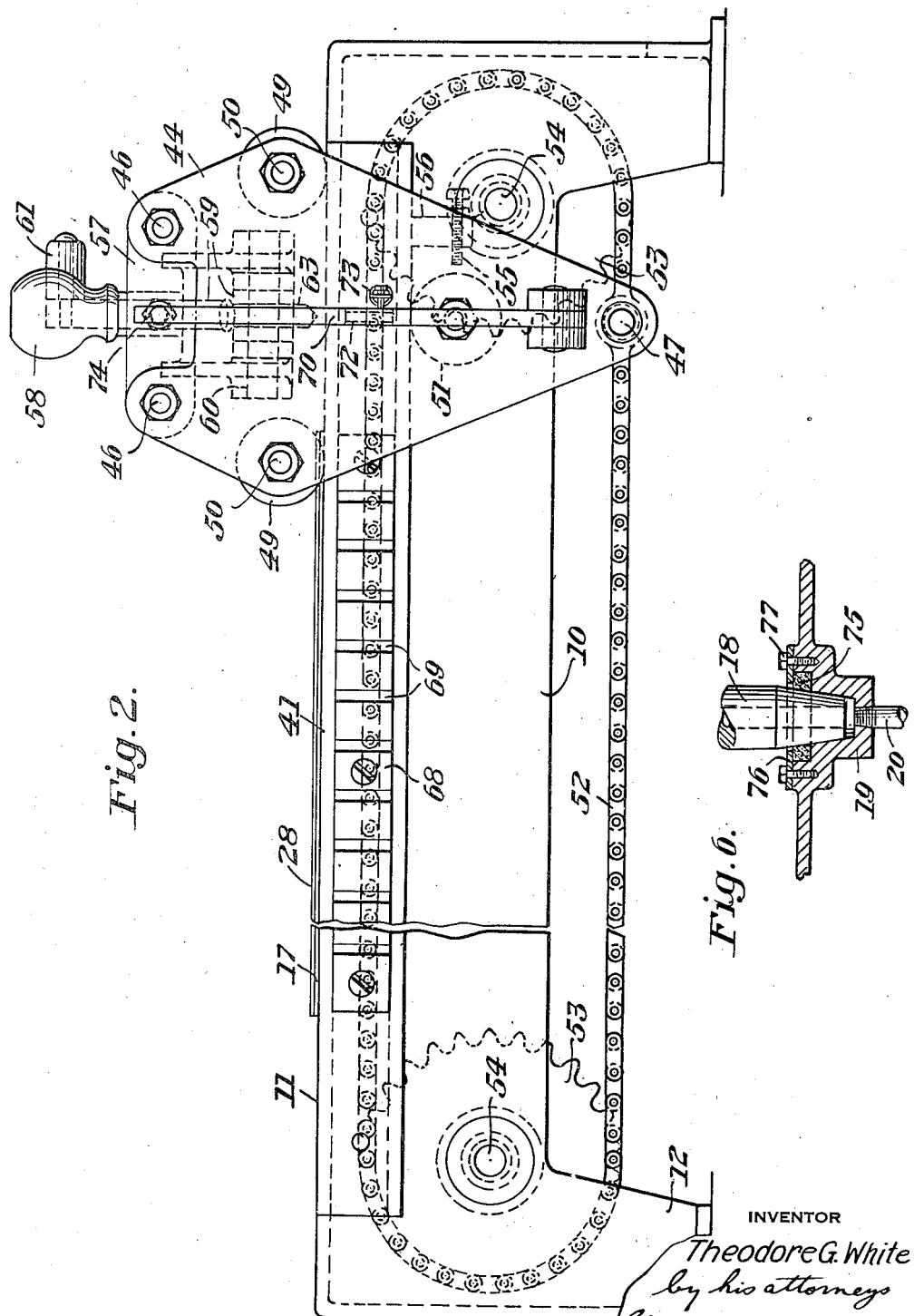

Dec. 19, 1944.  T. G. WEIHS,  2,365,503
NOW BY JUDICIAL CHANGE OF NAME
T. G. WHITE
METHOD AND APPARATUS FOR SCORING COVER GLASS
Filed March 27, 1942  3 Sheets-Sheet 3
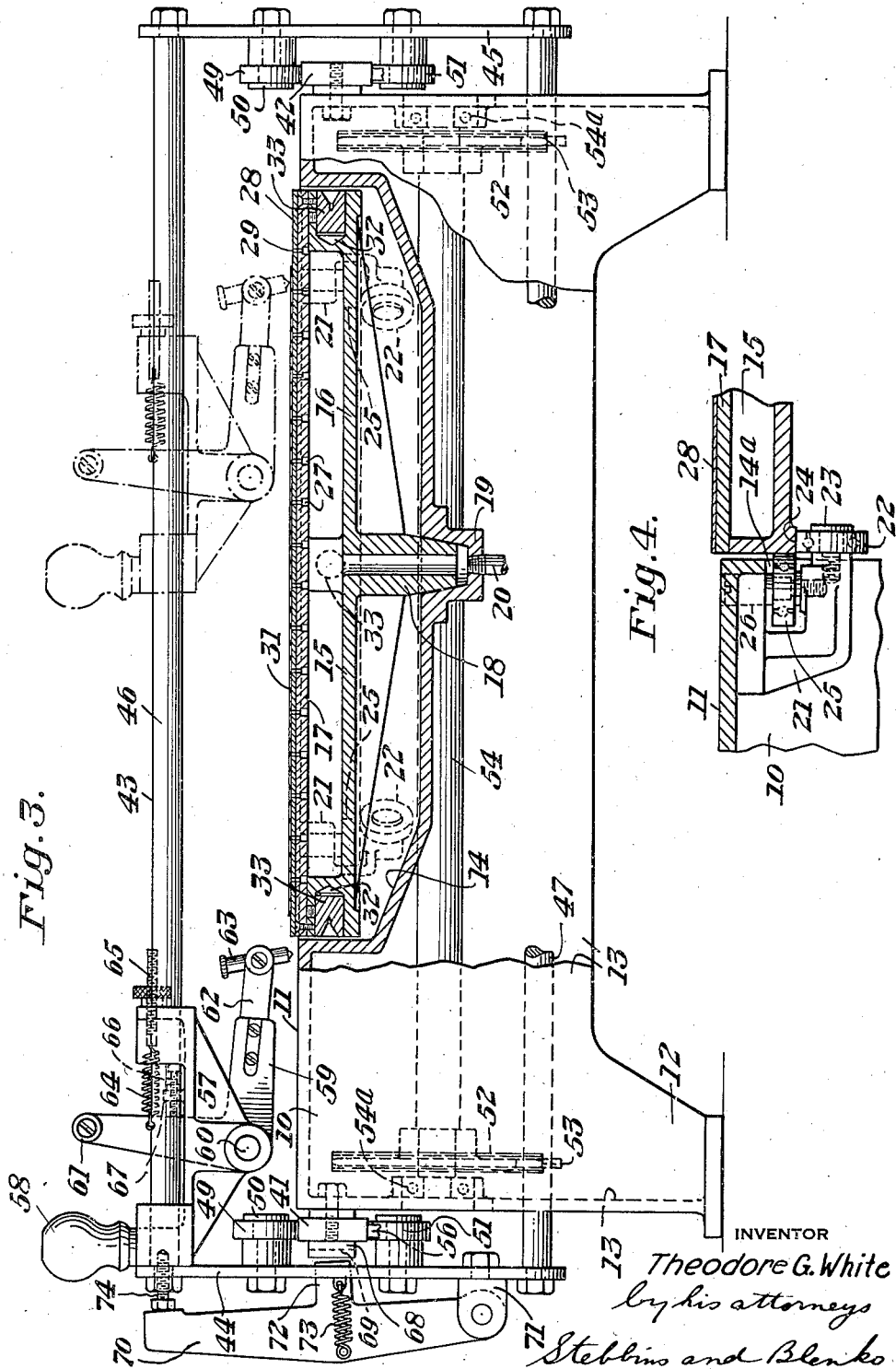
INVENTOR
Theodore G. White
by his attorneys
Stebbins and Blenko Patented Dec. 19, 1944

2,365,503

UNITED STATES PATENT OFFICE 2,365,503

METHOD AND APPARATUS FOR SCORING COVER GLASS

Theodor G. Weihs, Pittsburgh, Pa.; now by judicial change of name Theodore G. White, assignor to American Window Glass Company, Pittsburgh, Pa., a corporation of Pennsylvania Application March 27, 1942, Serial No. 436,425

5 Claims. (Cl. 33—26)

This invention relates to the production of cover glass, i. e., thin sheet glass, .005" to .007" thick, in small pieces cut accurately to size and usually square or rectangular in shape.

Cover glass is produced in roughly circular sheets 8" or larger in diameter and must be cut to size before it is ready for shipment to the user. Heretofore, so far as I am aware, hand scoring and breaking of the sheet has been the only method of cutting cover glass to size. The flexibility and fragility of the material resulting from its small thickness introduce considerable difficulty into the cutting operation and it is for this reason that, although machines have been designed for cutting window glass and the like to size, it has proved impossible to utilize such machines for cutting cover glass.

The cutting of cover glass by hand is open to serious objections. In the first place, it requires a high degree of skill and the labor cost of the operation is high because only a relatively limited output is obtained per man-hour. In the second place, the cutting by hand introduces slight variations in the size of the pieces as a result of the fact that the cutting tool as it traverses the scoring guide is not always held at a constant angle to the sheet being scored. In addition, the pressure applied to the scoring tool by the cutter often varies in different portions of the stroke of the tool. If the pressure is below a certain value, there is less likelihood that a clean break will result. If the pressure on the tool is excessive, the sheet may shatter causing a loss of material.

There are several reasons why it has proved impossible to score cover glass by machines which have been developed for scoring thicker grades of sheet glass. One of these is the fact that cover glass sheets as delivered for scoring are highly irregular in outline. In addition, the fragility of the material presents a serious problem in the matter of mere handling and holding in position during scoring, without excessive breakage. In most cutting machines, scoring tools are advanced into engagement with the edge of a sheet disposed at right angles to the path of the tools and the latter ride up over the edge and commence scoring immediately. This mode of operation cannot be adopted in scoring cover glass because of the aforementioned irregularity in the shape thereof. By reason of this irregularity, a cutting tool advancing toward a sheet of cover glass might engage an edge making a very acute angle with the path of the tool whereby excessive lateral pressure would be exerted by the tool and the sheet possibly shattered, since the tool would tend to "dig" into the sheet instead of riding up over the edge and immediately commencing a score.

I have invented a novel method and apparatus for scoring cover glass so that it can easily be broken by hand into accurately sized pieces of the desired dimensions and shape, at a production rate per man-hour considerably higher than the best results obtained by hand scoring and with a higher percentage yield of salable material. In a preferred practice of the invention, I dispose a sheet of cover glass on a carrier plate or support having perforations therethrough and induce a flow of air through said perforations to hold the sheet on the support frictionally. I then lower a scoring tool into engagement with the surface of the cover glass sheet at a point spaced inwardly from the edge thereof and traverse it across the sheet, guiding it accurately along a predetermined path and maintaining a uniform pressure thereon. I repeat this operation to form a plurality of spaced parallel scores in groups intersecting each other at right angles and then remove the support and sheet from the scoring position. The scored sheet is then passed to a severing or breaking position at which it is broken along the scores, into a plurality of accurately sized pieces of the required shape and dimensions.

My invention has utility chiefly in connection with the apparatus disclosed herein which is also disclosed and some features thereof claimed in the co-pending application of Norman H. Klages, Serial No. 434,730, filed March 14, 1942, for Apparatus for scoring cover glass, on which Patent 2,357,206 issued August 29, 1944.

A complete understanding of the invention, its details, novel features and advantages, may be had by a consideration of the following description and explanation referring to the accompanying drawings illustrating apparatus adapted for the carrying out of the invention.

In the drawings,

Figure 2 is a side elevation;

Figure 3 is a view partly in end elevation and partly in section along the plane of line III—III of Figure 1;

Figure 4 is a partial section along the plane of line IV—IV of Figure 1;

Figure 6 is a partial section showing the modification of a portion of Figure 3.

Figure 1:
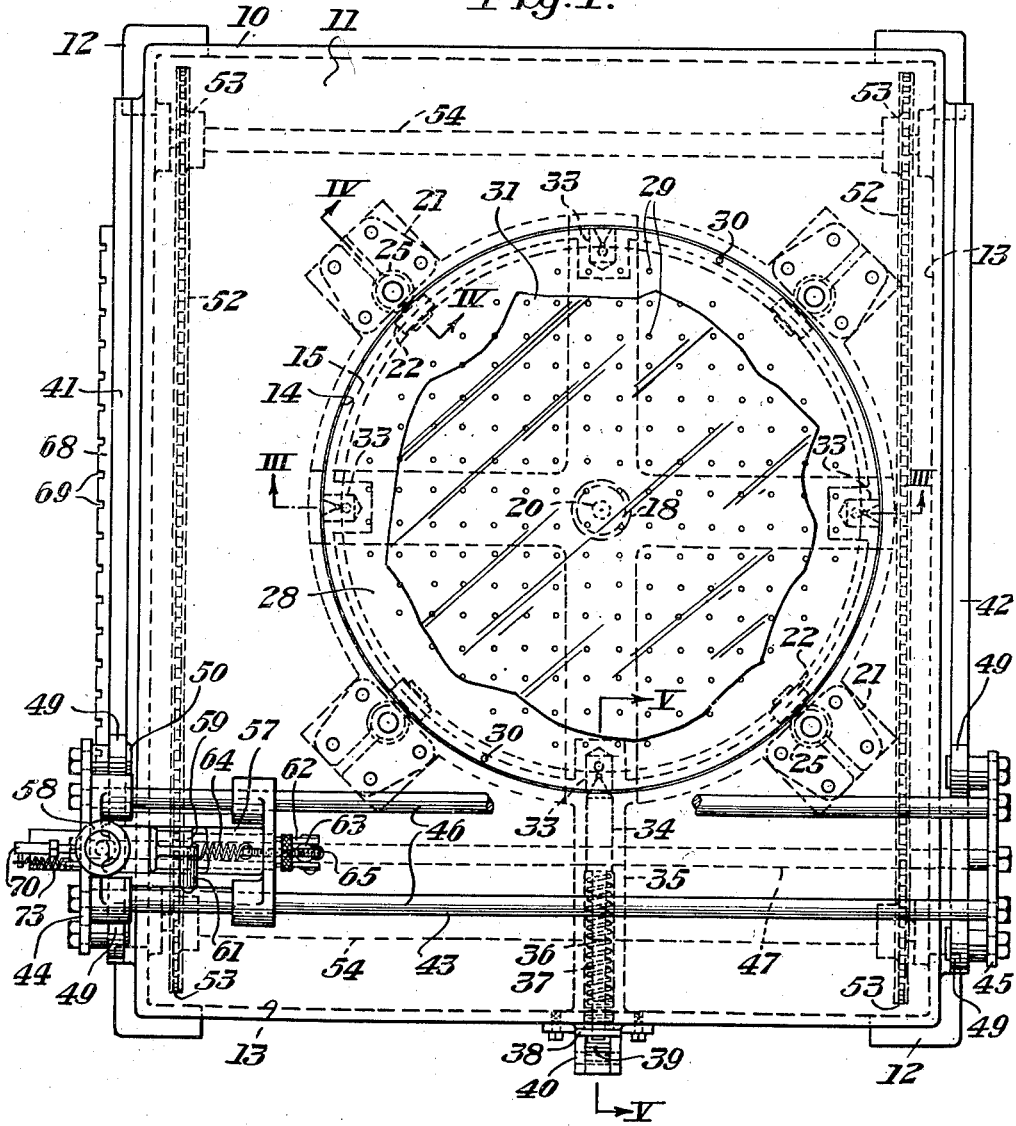
Figure 1 is a plan view of a scoring apparatus embodying the principles of my invention.

Referring now in detail to the drawings, one form of apparatus for carrying out the method of my invention comprises a base or frame 10 having a top or working surface 11 and supporting legs 12. The base 10 may conveniently be a casting and has side flanges or webs 13 extending between the legs 12.

A well or depression 14 is formed in the top 11 of the base and is adapted to receive a circular turn-table 15. The table 15 includes a hollow body 16 having a perforated cover plate 17 secured thereon. A central stud 18 extends downwardly from the table and into a hub 19 formed on the bottom of the well 14. The cooperating surfaces of the stud and hub are correspondingly tapered to provide a fairly close fit. A pipe 20 is threaded into the hub 19 and provides a connection to a suitable source of suction as will be explained more fully hereafter.

Roller brackets 21 are secured below the top 11 adjacent the well 14 and in circumferentially spaced relation therearound. The side wall of the well 14 is recessed as at 14a to admit the lower, inwardly projecting portions of the brackets. Bearing rollers 22 are journaled on screw shafts 23 threaded into horizontal tapped holes in the brackets 21 and support the table 15 for rotation. The bottom of the table is machined as at 24 to provide a raceway engaging the rollers 22. Centering rollers 25 are journaled on screw posts 26 inserted through holes in the top 11 and threaded into vertical tapped holes in the brackets 21. The rollers 25 engage the periphery of the table 15 and keep it properly centered in the well 14 as it turns on the bearing or supporting rollers 22. The portions of the shafts 23 and posts 26 on which the rollers 22 and 25 are disposed may be eccentric with respect to the axes of the shafts and posts whereby the rollers 22 may be adjusted vertically and the rollers 25 horizontally on rotation of the shafts and posts, respectively.

The perforations in the cover plate 17 are indicated at 27 and are preferably distributed over the surface thereof uniformly. A carrier plate 28 is removably disposed on the cover plate 17 and has perforations 29 formed therein adapted to register with the perforations 27 when the plate is disposed on the table concentrically thereof. To facilitate proper placement of the plate on the table, the latter has pins 30 spaced circumferentially thereof adapted to enter suitable holes in the plate. By virtue of the construction described, a sheet of cover glass 31 may be disposed on a carrier plate 28 before the latter is disposed on the table 15. On placement of the carrier plate and induction of air through the perforations 27 and 29 remaining uncovered by the sheet 31, the latter is held against the carrier plate by air pressure with sufficient force to hold it frictionally against sliding under horizontal forces of the order of those produced by traversing a scoring tool across the sheet.

For inducing a flow of air through the perforations 27 and 29 into the hollow interior of the table 15 and outwardly thereof through the stud 18 and pipe connection 20, I employ an air-exhaust or suction pump capable of handling a relatively large volume of air and maintaining only a moderate degree of vacuum. For example, I have successfully employed a household suction cleaner having a capacity of between 35 and 45 cubic feet per minute and capable of maintaining a vacuum of about 45 inches of water. It will be apparent that, when using such a device, air is drawn through the perforations remaining uncovered by the glass sheet with some leakage of air between the sheet and the carrier plate into the perforations covered by the former. As shown in Figure 1, the sheet covers a greater or lesser area of the plate 28, depending on its size and outline. Since I employ a relatively low degree of vacuum or suction and a suction device having a relatively large capacity, the air drawn through the uncovered perforations may readily be exhausted from the hollow interior of the table 15. The resulting vacuum below the glass sheet leaves the pressure of the air thereabove unbalanced whereby the sheet is pressed against the carrier plate with sufficient force to grip it frictionally and resist sliding under the horizontal force exerted thereon by a scoring tool.

Since cover glass is usually marketed in the form of square or rectangular pieces, I provide means for securely locking the table 15 in two scoring positions at right angles to each other. Sockets 32 are bored radially into the periphery of the table 15 and are spaced apart 90° circumferentially thereof. Index plugs 33 are inserted in the sockets 32 and are provided with tapering recesses in their outer ends. An index plunger 34 having a pointed inner end adapted to enter the recesses in the outer ends of the plugs 33, is slidable axially in a guide sleeve or tube 35 which may conveniently be formed integral with the top 11 of the base 10. The index plunger is normally urged inwardly by a compression spring 36 disposed about a reduced stem 37 extending rearwardly from the plunger 34. The spring is held in position by a plug 38 threaded in the outer end of the tube 35. A thumb lever 39 is pivoted to the end of the stem 37 projecting through the plug 38 and also to a bracket 40 secured to one of the webs 13 of the base 10.

Figure 5:
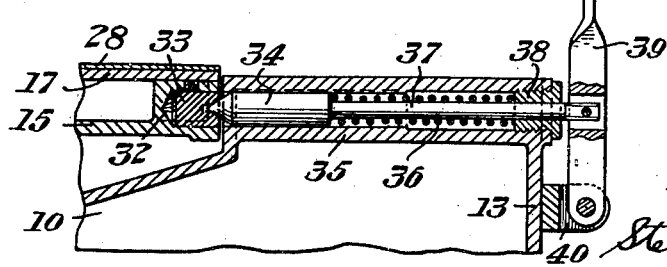
Figure 5 is a partial section along the plane of line V—V of Figure 1.

When the plunger 34 is in the position shown in Figure 5, it locks the table 15 against rotation by virtue of the engagement of the plunger with the plug 33. When it it desired to rotate the table 15, it is only necessary to press outwardly on the upper end of the lever 39 and then turn the table as desired by hand. If the table is to be turned 90°, the release of the lever 39 when an adjacent plug 33 is in alinement therewith serves to lock the table in a position at exactly 90° to its former position.

Having explained the turn table or rotatable support for the glass sheet to be scored and the manner of securing the sheet thereto, it now remains to explain the provisions for scoring the sheet.

Rails 41 and 42 extend along opposite sides of the working surface 11. A traveling bridge indicated generally at 43 is adapted to move along these rails. The bridge comprises brackets 44 and 45 and upper and lower tie rods 46 and 47 extending therebetween. Supporting rollers 49 are journaled on shafts 50 extending inwardly from the brackets 44 and 45 and rest on the upper edges of the rails 41 and 42. Hold-down rollers 51 are similarly mounted and engage the lower edges of the rails. By this construction, the traveling bridge 43 is adapted to move back and forth across the table 15. In order to insure equal and simultaneous movements of both ends of the bridge even though the force necessary to move it is applied manually to only one end thereof, I provide chains 52 having their ends pinned to the lower ends of the brackets 44 and 45 and trained around sprockets 53 adjacent the ends of the path of the bridge. The sprockets 53 are keyed to shafts 54 extending across the base 10 below the top 11 thereof and journaled in bearings 54a secured to the inner surface of the webs 13. It will be apparent that movement of either end of the bridge 43 immediately turns the sprockets and thereby produces an equal and simultaneous movement of the other end of the bridge. A stop screw 55 is threaded through a lug 56 depending from rail 41 and is adapted to engage roller 51 on bracket 44 and thereby serves to limit movement of the bridge 43 toward the lever 39.

A slide 57 is movable along the tie rods 46. The slide has a knob 58 adapted to be engaged by the palm of the operator's hand, for causing movement of the slide. A lever 59 pivoted to the slide at 60 serves as a tool holder and has a knob 61 at the upper end thereof which may conveniently be engaged by the forefinger of the hand of the operator which engages the knob 58 on the slide. A tool mount 62 is secured to the lever 59. A scoring tool 63 is positioned in the mount 62 in such relation thereto as to engage the sheet 31 as the slide moves along the tie rods 46. The lever 59 is normally urged clockwise as viewed in Figure 3 by a tension spring 64 secured thereto and also to an adjusting screw 65 extending through one side of the slide and having a knurled adjusting nut thereon. A stop screw 66 threaded through a lug 67 limits clockwise movement of the lever 59.

In order to hold the bridge 43 in properly spaced positions along the length of the working surface 11, I provide a gauge bar 68 secured to and extending along the rail 41. The bar 68 has transverse notches 69 formed therein at suitable intervals therealong. A gauge lever 70 is pivoted to a clevis 71 secured to bracket 44 and has a projecting portion or finger 72 adapted to enter the slot 69. A spring 73 secured to the lever 70 and the bracket 44 normally urges the lever clockwise as viewed in Figure 3. A screw 74 is threaded into a horizontal hole in the slide 57 adjacent the knob 58. The screw has a lock nut thereon for locking it in adjusted position. When the slide is in the position shown in solid lines in Figure 3, the lever 70 is shifted so that the projecting portion or finger 72 thereof is withdrawn from engagement with the gauge bar 68. When the slide has been advanced slightly, the spring 73 causes the finger 72 to engage the bar 68 and enter the first slot 69 therein with which it is thereafter alined.

The operation of the apparatus, while probably apparent from the description thereof, will now be briefly reviewed. A glass sheet such as that indicated at 31 having been placed on the plate 28 after removal of the latter from the table 15, the plate is replaced on the table so that the holes in the plate aline with those in the cover plate 17 of the table 15. Suction is then applied to the interior of the table by means of a suitable control valve or by starting the suction pump. The glass sheet is thereby frictionally held on the table in position for scoring.

The operator then places his hand on the knob 58 of the slide 57 and with the forefinger of the same hand tilts the lever 59 to raise the tool 63. With the slide in the position shown in solid lines in Figure 3, the bridge 43 is positioned adjacent one side of the sheet 31. The slide is then moved forward slightly and the bridge traversed back and forth through a small distance until the finger 72 of the lever 70 enters one of the slots 59 in the gauge bar 68. The slide 57 is then positioned, as shown in chain lines in Figure 3, so that the tool 63 is spaced slightly inwardly of the edge of the sheet remote from the operator. The lever 59 is then released gently whereupon the tool 63 engages the sheet. The slide 57 is then moved toward the position shown in solid lines in Figure 3 with the result that the tool 63 produces a straight score across the surface of the sheet with a high degree of precision.

It will be apparent that completion of the traversing movement of the slide 57 automatically causes the lever 70 to disengage the bar 68 as above explained whereupon the bridge is ready for movement to the position for making the next score. The procedure described is then repeated until the entire surface of the glass sheet has been scored along spaced parallel lines. The sheet is then ready for the formation of a second similar set of scores at right angles. To accomplish this, the lever 39 is tilted to free the table 15 for rotation. After the table has been turned through 90°, it is again locked in position by releasing the lever 39. The scoring operation is then repeated, producing a second set of parallel scores at right angles to that first formed.

It will be noted that the scoring tool exerts a pressure on the glass sheet which is substantially unvarying regardless of small variations in the thickness of the glass sheet itself. This is because the pressure exerted by the tool is determined by the torque applied to the lever 59 by the spring 64 and that is constant for minor changes in the angular position of the lever such as would result from high and low spots in the surface of the sheet being scored.

When the sheet 31 has been scored in both directions, the plate 28 with the scored sheet thereon is removed from the table 15, the bridge 43 having been disposed to one side of the base. The suction applied to the table may first be shut off to facilitate removal of the plate. Immediately the plate 28 has been removed, another similar plate having a glass sheet thereon is placed on the table and scoring thereof is commenced. At the same time, the previously scored sheet is passed along to an operator whose sole function is to break the sheet along the scores formed therein and stack the perfect pieces for packing and shipping. The removal of the plate 28 from the table 15 equalizes the air pressure on both sides of the sheet 31 and thus permits the latter to be easily removed from the plate and severed into small pieces. By the procedure described, the scoring device operates practically full-time without interruptions or loss of time for severance of the scored pieces or cleaning up the scrap. This makes possible a greater output per man-hour and reduces the labor cost because the severing or breaking operation requires little or no skill. As a matter of fact, unskilled labor may be trained in the practice of the scoring method and in the use of the apparatus disclosed, in a very short time.

A modification of a detail is illustrated in Figure 6. According to the modification, the joint between the stud 18 of the table 15 and the hub 19 of the well 14 is sealed by a gland 75 disposed in a counterbore in the hub 19 and compressed against the stud 18 by a compression ring 76 secured to the top face of the hub by screws 77. This modification will ordinarily not be necessary although it may be provided if desired to limit the leakage of air between the stud 18 and hub 19.

It will be apparent from the foregoing description and explanation that the invention is characterized by numerous advantages over the prior practice in scoring and severing cover glass. In the first place, the invention makes it possible for two operators, one scoring and one breaking, to produce twice as much cover glass as two operators cutting by hand, each breaking the sheets after scoring thereof. The scoring apparatus disclosed is free from human errors and its precision is limited only by the tolerances permitted in the finishing of machine parts which can be made almost negligible. The percentage of salable material produced by the aid of the invention is greater than that produced by hand cutting methods because the uniformity of the pressure on the scoring tool practically eliminates accidental shattering of a sheet during scoring. The difficulty in the application of machine scoring to cover glass is overcome by making the scores individually and by lowering the scoring tool into contact with the glass sheet at points spaced inwardly from the edge thereof. The ability to operate the machine rapidly may be acquired with a little practice but requires no special skill.

The invention is particularly useful in the scoring of cover glass along straight lines for severance into square or rectangular pieces. It may also be employed, however, for cutting discs of cover glass by appropriately placing the scoring tool and rotating the table with the glass sheet thereon.

Although I have illustrated but a preferred embodiment of the method and apparatus of my invention with a modification of a detail of construction, it will be understood that changes in the construction and operations disclosed may be made without departing from the spirit of the invention or the scope of the appended claims.

I claim:

1. In an apparatus for scoring glass sheets, a table for supporting a sheet in position for engagement by a scoring tool traveling across said sheet, said table including a perforated top plate, a suction chamber therebelow and a perforated carrier plate removably disposed on said top plate and adapted to receive a sheet to be scored.

2. In an apparatus for scoring glass sheets, a table for supporting a sheet in position for engagement by a scoring tool traveling across said sheet, said table including a perforated top plate, a suction chamber therebelow, a perforated carrier plate removably disposed on said top plate and adapted to receive a sheet to be scored and means holding said carrier plate so its perforations register with those of said top plate.

3. In a method of scoring thin, flexible sheet glass such as cover glass, the steps including depositing a sheet on a perforated carrier, depositing the carrier and sheet on a perforated support, effecting a suction of air through the support and carrier, scoring the sheet while held in frictional engagement with said carrier by the pressure of the air thereabove, then removing said carrier from said support and removing the scored sheet or severed pieces thereof from said carrier.

4. In a method of scoring thin, flexible sheet glass such as cover glass, the steps including depositing a sheet on a perforated carrier, depositing the carrier and sheet on a perforated support with the perforations of the carrier registering with those of the support, effecting a suction of air through the support and carrier principally through the holes therein remaining uncovered by the sheet, scoring the sheet while held in frictional engagement with said carrier by the pressure of the air thereabove, then removing said carrier from said support and removing the scored sheet or severed pieces thereof from said carrier.

5. In a method of scoring thin, flexible sheet glass such as cover glass, the steps including depositing a sheet on a perforated carrier, depositing the carrier and sheet on a perforated support, effecting a suction of air through the support and carrier, scoring the sheet while held in frictional engagement with said carrier by the pressure of the air thereabove, then lifting said carrier from said support and lifting the scored sheet or severed pieces thereof from said carrier.

THEODOR G. WEIHS.